(12) United States Patent
Bertkau et al.

(10) Patent No.: US 8,863,841 B2
(45) Date of Patent: Oct. 21, 2014

(54) ALKANESULFONIC ACID MICROCAPSULES AND USE THEREOF IN DEEP WELLS

(75) Inventors: Walter Bertkau, Ludwigshafen (DE); Norbert Steidl, Kienberg (DE)

(73) Assignee: BASF SE, Ludwigshafen (DE)

( * ) Notice: Subject to any disclaimer, the term of this patent is extended or adjusted under 35 U.S.C. 154(b) by 249 days.

(21) Appl. No.: 13/410,996

(22) Filed: Mar. 2, 2012

(65) Prior Publication Data

US 2012/0222863 A1 Sep. 6, 2012

Related U.S. Application Data

(60) Provisional application No. 61/448,210, filed on Mar. 2, 2011.

(51) Int. Cl.
| | | |
|---|---|---|
| *E21B 43/22* | (2006.01) | |
| *C09K 8/72* | (2006.01) | |
| *C09K 8/92* | (2006.01) | |
| *B32B 27/06* | (2006.01) | |

(52) U.S. Cl.
CPC .... *C09K 8/92* (2013.01); *C09K 8/72* (2013.01)
USPC ........... 166/307; 166/270; 166/300; 428/407; 524/262

(58) Field of Classification Search
None
See application file for complete search history.

(56) References Cited

U.S. PATENT DOCUMENTS

| | | | |
|---|---|---|---|
| 4,036,301 A | 7/1977 | Powers et al. | |
| 6,207,620 B1 | 3/2001 | Gonzalez et al. | |
| 7,638,469 B2 * | 12/2009 | Heidenfelder et al. | 507/259 |
| 2002/0022038 A1 | 2/2002 | Biatry et al. | |
| 2003/0221831 A1 | 12/2003 | Reddy et al. | |
| 2004/0168801 A1 | 9/2004 | Reddy et al. | |
| 2008/0227888 A1 * | 9/2008 | Jobmann et al. | 523/200 |
| 2009/0192053 A1 * | 7/2009 | Crews et al. | 507/201 |
| 2010/0324186 A1 * | 12/2010 | Birmingham et al. | 524/262 |

FOREIGN PATENT DOCUMENTS

| | | |
|---|---|---|
| DE | 40 22 648 A1 | 1/1992 |
| DE | 43 39 801 A1 | 5/1994 |
| DE | 10 2005 010 564 A1 | 11/2006 |
| EP | 1 151 741 A1 | 11/2001 |
| EP | 1 428 571 A1 | 6/2004 |
| WO | WO 95/14641 A1 | 6/1995 |
| WO | WO 00/75486 A1 | 12/2000 |
| WO | WO 2006/092438 A1 | 9/2006 |

OTHER PUBLICATIONS

Intenational Search Report issued May 22, 2012 in PCT/EP2012/053402 filed Feb. 29, 2012 with English translation of categories of cited documents.

* cited by examiner

*Primary Examiner* — Zakiya W Bates
(74) *Attorney, Agent, or Firm* — Oblon, Spivak, McClelland, Maier & Neustadt, L.L.P.

(57) ABSTRACT

Alkanesulfonic acid microcapsules and the use thereof as an additive for acidizing applications in carbonatic rock formations, especially for increasing the permeability of underground carbonatic mineral oil- and/or natural gas-bearing and/or hydrothermal rock formations and for dissolving carbonatic and/or carbonate-containing impurities in the production of mineral oil and/or natural gas or geothermal power generation are described. Additionally described is an acidic formulation comprising the inventive microcapsules and the use thereof for the aforementioned purpose, and a corresponding process.

19 Claims, No Drawings

ALKANESULFONIC ACID MICROCAPSULES AND USE THEREOF IN DEEP WELLS

This patent application claims the benefit of U.S. provisional patent application Ser. No. 61/448,210 filed Mar. 2, 2011 incorporated in its entirety herein by reference.

The invention relates to alkanesulfonic acid microcapsules and to the use thereof as an additive for acidizing applications, especially for increasing the permeability of underground carbonatic mineral oil-, natural gas- and/or hot water-bearing rock formations and for dissolving carbonatic and/or carbonate-containing impurities in the production of mineral oil and/or natural gas or geothermal power generation. The invention further provides an acidic formulation comprising the inventive microcapsules, and the use thereof for the aforementioned purpose, and a corresponding process.

Mineral oil or natural gas production involves drilling into mineral oil- and/or natural gas-bearing rock formations, and geothermal power generation drilling into hot water-bearing rock formations, known as aquifers. Typical rock formations comprise sandstone formations and/or carbonate formations. In sandstone formations, the silicatic mineral particles are frequently embedded in a carbonatic matrix. In this case, the primary spaces present between the mineral grains are cemented diagenetically with carbonates under later geological conditions. The carbonatic rock formations which arise from pure chemical precipitation reactions may of course also have certain fine-grain silicate components.

The mineral oil, natural gas and/or hot water, referred to hereinafter as the medium to be produced, moves toward the borehole through fissures and pores connected to one another due to the difference between the pressure in the formation and the pressure in the borehole, and is produced therefrom to the surface. The pressure in the formation is of hydrostatic origin in the majority of cases and can be maintained artificially by injecting typically liquid media through injection wells.

In order to ensure a sufficient production rate for the medium to be produced, sufficient porosity of the rock formation alone is insufficient. Only the joining of the pore spaces to one another establishes the necessary permeability within the rock formation. Frequently, the natural permeability of the reservoir formation is insufficient, or has inadvertently been reduced by blockage in the area around the well by additive particles of the unavoidable drilling mud. To increase or restore the permeability, two applications are known: 1.) The acidizing process, wherein an acid or acid formulation is injected into the reservoir formation with moderate pressure and the migration paths are reestablished and/or widened by the dissolution processes which follow in the reservoir formation. 2.) Hydraulic fracking, in which the target formation is fractured laterally and hydraulically, and simultaneously acidized, with very high injection pressure (known as "fracturing treatment" or "fracturing"), and the newly formed and simultaneously widened network of fissures which runs radially with respect to the well functions as drainage.

To develop a geothermal deposit, the aquifer, generally one (or more) withdrawal well(s) and one (or more) injection well(s), referred to collectively as a cluster, are sunk in the directional drilling process, the distances between which underground may be several thousand meters from one another. Above ground, this cluster is generally on one site, the later operating area of the power plant.

A prerequisite for efficient geothermal power generation, in which the hot water circulating in fissures and pores in the rock is extracted, the energy is removed from it and it is finally reinjected again, is a maximum permeability in the rock in order that maximum convective heat transport through the circulating hot water is ensured. A condition for hydrothermal utilization is thus an aquifer which is sufficiently hot and is high-performing with regard to the production rate. To enhance the permeability and to increase the area for the purpose of increasing heat transfer, not only the direct zone around the borehole but a considerable part of the formation in question is "stimulated", which means that natural fissures present are widened by acidizing and new fissures may be generated by hydraulic fracturing, or both are combined. In this way, enhanced inflow/injection rates are achieved. In the low-enthalpy aquifers, the temperatures of the fluid produced are generally 100° C. to 160° C. High-enthalpy aquifers occur in conjunction with volcanic activity even at low depths (for example in Iceland, Indonesia, Japan etc.) and provide fluids at several hundred degrees.

Loose floating mineral particles or mineral deposits from the (concomitantly) produced formation waters may already be blocking the migration paths within the reservoir formation or the downstream production or process conduit systems, and lead ultimately to decreasing production rates. These deposits are attributable to higher flow rates in the environments closer to the borehole and/or altered pressure/temperature conditions in the production stream. Typical deposits are, for example, of carbonatic, sulfatic or else sulfidic origin. If these precipitation processes are taking place, for example, within the reservoir rock, the porosity present is actually closed with cement and hence the permeability of the rock formation is therefore reduced drastically. If these precipitation reactions are taking place on the route to the surface of the earth or in the course of flow through the equipment above ground (pipes, heat exchangers, etc.), the mineral deposits precipitated severely reduce the flow rates of the conduit systems and hence a maximum production rate.

It is known that such secondary blockages in the borehole or in the formation can be dissolved by an acid treatment (also called "acidizing treatment" or "acidizing"). In addition, an acid treatment can create new fissures or pores in the formation. Further details on this subject are presented, for example, in *Ullmann's Encyclopedia of Industrial Chemistry, 6th Edt.*, 2000 Electronic Release, "Resources of Oil and Gas, 3.4.2. General Production Engineering".

The acids used for the acid treatment are, according to the reservoir rock, for example, aqueous solutions of HF and/or HCl. HF is suitable here by its nature for silicatic formations, and HCl is used especially for carbonatic formations. However, the use of organic acids has also already been disclosed.

Due to high vapor pressure, HCl is not very suitable for use at relatively high temperatures which prevail at great depths in carbonatic rock. Furthermore, HCl is highly corrosive to the pipe steels used in a borehole and has a marked tendency to pitting corrosion especially at relatively high temperatures. In addition, HCl exhibits a very spontaneous, locally pronounced and comparatively unsustainable reaction with the limestone to form acid-containing cavities with only a small amount of reactive edge contact with the carbonate, such that there can be no sustainable effect in regions of fine fissures far removed from the borehole. In addition, the heated hydrochloric acid which has not reacted in the reservoir rock severely damages the metallic riser strings in the borehole by pitting corrosion during the recovery phase.

Alkanesulfonic acids, optionally in a mixture with other acids, for example amidosulfonic acid, are disclosed for removal of lime deposits, especially in the household (WO 95/14641).

In order to avoid the aforementioned disadvantages caused by HCl, WO 2006/092438 proposes the use of alkanesulfonic acids, preferably methanesulfonic acid (MSA), to increase the permeability of underground carbonatic mineral oil- and/or natural gas-bearing rock formations, and to dissolve carbonatic and/or carbonate-containing impurities in mineral oil production, especially at a temperature of at least 100° C.

A further existing problem in deposit stimulation is that the effect of the acid employed is generally unsustainable since the acid displays its full effect only in the regions of the rock formation close to the borehole, and not, or only insufficiently, in the further-removed regions of the fissure system of the reservoir formation. The cause of this is, for example, the formation of acid-containing caverns as a result of a local oversupply of acid, as a result of which hot unconsumed acid is produced back at the surface in the backflush operation.

It is therefore an object of the present invention to provide an acid or an acid-based system which ensures a controlled, continuous and retarded mordant effect on the fissure and pore spaces of underground carbonatic mineral oil- and/or natural gas-bearing or hot water-bearing rock formations in deep wells for mineral oil, natural gas or hot water production, and is barely corrosive with regard to the metallic borehole equipment.

The object is achieved by the inventive alkanesulfonic acid microcapsules which are used as an additive for acidizing applications, optionally also in conjunction with fracking treatments.

The invention provides a microcapsule comprising a core and at least one shell, wherein the core is composed of at least one alkanesulfonic acid of the general formula $$R^1\text{—}SO_3H,$$

in which $R^1$ is a straight-chain, branched or cyclic $C_1$- to $C_6$-alkyl radical, preferably a $C_1$- to $C_4$-alkyl radical; and the shell is composed of at least one synthetic or natural wax, and the density of the microcapsule is greater than 1.0 g/cm$^3$.

The person skilled in the art selects the $R^1$ radical with the proviso that the alkanesulfonic acid should still have a sufficient solubility in water.

It will be appreciated that it is also possible to use mixtures of different alkanesulfonic acids as defined above.

Particular preference is given to using methanesulfonic acid (abbreviated to MSA, formula: ) for the core of the microcapsule. Methanesulfonic acid is a strong acid (pK$_a$: −2), but, in contrast to HCl or formic acid, has only a low vapor pressure. It is therefore very particularly also suitable for use at relatively high temperatures.

Preference is given to using anhydrous alkanesulfonic acid, especially pure, 100% MSA, as the core of the microcapsule. This is commercially available, for example as Lutropur® MSA 100. It is also possible, though less preferred, to use alkanesulfonic acid dissolved in water (e.g. Lutropur® MSA (70% product variant) with 30% water) and/or alternatively in a water-miscible organic solvent (e.g. alcohol such as methanol, ethanol or propanol).

The shell may be composed of one or more shells, in which case each may be formed from one or more different waxes. The microcapsule preferably has one shell. Suitable waxes for the shell material of the inventive microcapsules are synthetic waxes based on polyethylene, polypropylene, or Fischer-Tropsch waxes which may optionally be chemically modified, or semisynthetic waxes such as amide waxes, montan waxes, paraffins and microcrystalline waxes or natural waxes, such as beeswax or carnauba wax, or else mixtures thereof. Preference is given to waxes selected from ethylene homo- and copolymer waxes, oxidized polyethylene waxes, polyether waxes, and montan acid and montan ester waxes. Such waxes are commercially available, for example as Luwax®. The melting points of the aforementioned wax types are within the range from 30 to 160° C., preferably 60 to 135° C., and so the person skilled in the art selects the shell material with regard to the end use.

The inventive microcapsules (MCs) have diameters of generally 100 μm to 5000 μm, preferably to 1000 μm; in fissured systems, preference is given to using 250 to 500 μm. The larger a capsule is, the higher the core/shell ratio. Since, for example, the density of pure anhydrous MSA is 1.48 g/cm$^3$, it has to be ensured that, by virtue of the specifically lighter wax shell, the resulting density of the microcapsules is greater than 1.0 g/cm$^3$, preferably greater than 1.2 g/cm$^3$. This ensures that, in the inventive use, described hereinafter, of the microcapsules as an additive to alkanesulfonic acids, the latter remain pumpable in an optimal manner down to large depths in aqueous media without any requirement for higher pump outputs and/or prolonged residence times in the acidizing string.

The inventive microcapsules can be produced by customary methods (Simon Benita, Microencapsulation, Methods and Industrial Applications, 2005, 2nd Edition) such as spray coating, emulsion polymerization, coacervation, sol-gel encapsulation, or by coextrusion, i.e. dropletization of the liquid core and shell material, for example in a spherizator unit with the aid of a vibrating double die system. The latter process is known (DE 4022648 A1) and is particularly suitable for production of the inventive microcapsules. Spherizator units with such vibrating double die systems are likewise known and are available on the market, for example from Brace GmbH.

The invention further provides for the use of the inventive microcapsules as an additive for acidizing applications, optionally also in conjunction with fracking treatments. Likewise in accordance with the invention are acidic formulations comprising the inventive microcapsules. The inventive acidic formulations are used in accordance with the invention for increasing the permeability of underground carbonatic mineral oil-, natural gas- and/or hot water-bearing rock formations and for dissolving carbonatic and/or carbonate-containing impurities in the production of mineral oil and/or natural gas or geothermal power generation.

For the inventive acidizing applications and acidic formulations, it is generally possible to use all acids suitable for the end use or aqueous solutions thereof as a base medium. Such acids are known to those skilled in the art. Examples of inorganic acids include hydrochloric acid, sulfuric acid or nitric acid, and examples of organic acids include water-soluble carboxylic acids such as formic acid and/or acetic acid, citric acid or alkane- and/or arylsulfonic acids. From a safety point of view, preference is given to acids which do not have a high vapor pressure.

According to the invention, preference is given to using water-soluble alkanesulfonic acid as the base medium for the acidizing application. It will be appreciated that it is also possible to use mixtures of different water-soluble alkanesulfonic acids. The alkanesulfonic acid(s) has/have the general formula $R^1\text{—}SO_3H$ already given for the core component, and is/are defined correspondingly, and it/they may be the same as or different than the core components.

Particular preference is given to using methanesulfonic acid for the base medium.

It is possible to use pure 100% alkanesulfonic acid(s), especially pure 100% MSA, as the base medium. However, preference is given to using an acidic aqueous solution or formulation of the alkanesulfonic acid(s), especially of MSA. The solvent is preferably water, but may also comprise small amounts of organic, water-miscible solvents. These may especially be alcohols, for example methanol, ethanol or propanol. In general, the proportion of water is at least 80% by weight, preferably 90% by weight and more preferably at least 95% by weight, based in each case on the total amount of all solvents used.

The concentration of the base medium is selected by the person skilled in the art according to the desired end use. However, a useful concentration has been found to be at least 5% by weight, preferably at least 10% by weight, more preferably at least 20% by weight and most preferably at least 50% by weight, based in each case on the sum of all components of the solution or formulation. For example, the concentration may be 65% to 75% by weight.

The above-defined alkanesulfonic acid(s), especially MSA, can be used particularly advantageously in accordance with the invention as the sole acid(s).

It will be appreciated, however, that they can also be used in combination with other acids, in which case the proportion thereof to achieve any possible synergistic effect should preferably be determined directly on the rock material of a corresponding drill core of the reservoir rock. Here too, as already stated above, volatile acids should be avoided, especially at high use temperatures.

In a further preferred embodiment of the invention, the acid used as the base medium, the aqueous solution thereof or the inventive formulation can be used in combination with at least one water-soluble corrosion inhibitor. The person skilled in the art is aware of corrosion inhibitors and makes a suitable selection according to the desired end use. It will be appreciated that it is also possible to use mixtures of different corrosion inhibitors. The content of corrosion inhibitor is selected by the person skilled in the art according to the desired use and is typically below 5% by volume, preferably less than 1% by volume, of the overall formulation.

Examples of suitable water-soluble corrosion inhibitors comprise alkyne derivatives, for example propargyl alcohol or 1,4-butynediol. Corrosion inhibitors of this type, and further suitable corrosion inhibitors, are obtainable, for example, under the Korantin® trade name.

The base medium or the inventive formulation may additionally, of course, also comprise customary additives and assistants which are typical for an acid treatment of oil- or gas-bearing rock formations. Examples of such assistants comprise, for example, polymers for increasing the viscosity, surfactants, foam formers or foam breakers, oxidizing agents, enzymes, assistants for reducing friction or for control of paraffin deposits, and biocides. The assistants used may preferably also be complexing agents such as nitrilotriacetic acid (NTA), ethylenediaminetetraacetic acid (EDTA), diethylenetriaminepentaacetic acid (DTPA), hydroxyethylethylene-diaminetriacetic acid (HEDTA) or methylglycinediacetic acid (MGDA). The content of additives is selected by the person skilled in the art according to the desired use.

The temperatures of deposits embedded in the earth's crust depend on the geothermal gradient, which is 3° C. per 100 meters in central Europe. Deposits close to the surface have temperatures which correspond to the average surface temperature. In mineral oil deposits, the temperatures range up to 135° C.; in natural gas deposits, temperatures up to 225° C. are attained. Thus, in principle, the temperatures in mineral oil and/or natural gas deposits—according to the depth of the deposit—may be very different. In the case of geothermal power generation, the temperatures in low-enthalpy deposits are 100 to 160° C. to achieve. In high-enthalpy aquifers, temperatures of several hundred degrees occur.

According to the selection of the wax type used for the shell of the microcapsule, it is possible to adjust the melting point of the shell in a variable manner, such that the opening of the inventive microcapsule can be controlled or "triggered" (triggered release) by the wax type as a function of the temperature in the deposit. According to the invention, the microcapsules added as an additive may have different trigger temperatures for different temperature windows in the deposits.

In addition, the microcapsules as such may comprise several layers each comprising different waxes. For the aforementioned end use, the melting point of the wax of the particular shell should increase from the outermost shell to the innermost shell.

In a preferred embodiment of the invention, inventive formulations which comprise mixtures of the inventive microcapsules are used, and the microcapsules present in the mixture have shells of waxes with different melting points. According to the intensity of the first step of the stimulation of the reservoir formation with the base medium, the rock formation has a concentric temperature gradient around the borehole which is a function of the distance from the borehole. On the basis of the temperatures which exist there, which are typically determined exactly in deep wells, the person skilled in the art can select a suitable microcapsule additive mixture and as a result control, in a cascade-like manner and thus sustainably, the acid dose even in fissures and pores in the rock which are far removed from the borehole.

In the aforementioned embodiment, the inventive microcapsules present in the mixture comprise different waxes with their respective type-dependent melting points within the range from 30 to 160°. These discrete melting points are also referred to as trigger temperatures since the microcapsule, as a result of a thermal trigger which, individually according to the wax type, triggers the melting of the particular shell material, releases its contents, i.e. the core component, in a controlled manner. The trigger in the present application is the temperature prevailing in the rock formation and the environment thereof. The aforementioned mixture or formulation generally has several trigger ranges, especially two or more of the following trigger ranges: 30-60° C., 60-70° C., 90-100° C., 110-120°, 130-135° C. and 140-160° C.

According to a further embodiment the aforementioned mixture or formulation has two or more of the following trigger ranges: 30-60° C., 60-90° C., 90-120° C. and 120-135° C.

The term "carbonatic rock formation" is known in principle to those skilled in the art and described, in general terms, the limestones which are now likewise present above ground in central Europe, for example those of Triassic muschelkalk, the Swabian and Franconian Alps, Swiss and French Jura, and the northern and southern limestone alps. Carbonatic rock formations may be of biogenic, evaporitic (precipitation from oversaturated solutions) or clastic (sedimented carbonate grains) origin and comprise essentially $CaCO_3$ or $CaMg(CO_3)_2$ in the mineral form of calcite, aragonite or dolomite, and possibly also magnesite. In addition, it is of course also possible for any other mineral carbonate compounds to be present as an addition, or else clastic impurities, for example of silicatic origin.

"Carbonatic rock formations" may be permeated in the course of formation primarily by a very high pore content (example: reef complexes in the northern Italian Dolomites), and may be widely fissured as a result of later dissolution reactions in the formation water cycle (karst regions) or severely fractured over wide ranges as a result of geotectonic overprinting (fissuring of the malm limestones in the bedrock of the Bavarian Molasse). These variable properties of the limestone make such formations exceptionally good potential storage rocks, both in the field of mineral oil/natural gas production and for geothermal power.

The term "carbonatic rock formation" shall also comprise carbonate-containing rock formations in which typical clastic mineral grains form the main constituent, and carbonates form a cementing crystalline matrix only in a later diagenetic process in the pore spaces which formerly remained. One example thereof is carbonatically bound, otherwise predominantly silicatic sandstone (for example the construction material of Cologne cathedral).

"Carbonatic and/or carbonate-containing impurities in mineral oil production" are deposits, which are unwanted in principle, of such materials, which can occur at all stages of mineral oil production from the formation up to the mineral oil dispensing equipment. These may, for example, be mineral precipitations from the saturated formation waters of the reservoir formation, which are triggered by pressure or temperature variations. Examples thereof are carbonatic or sulfatic deposits of natural origin, on fissured surfaces or in pore spaces of the formation. Synthetic impurities are, for example, $CaCO_3$-containing filtercake residues, which are unavoidably entrained into the formation during the drilling operation, and which have to be removed again after the drilling operation and before commencement of production. The formations affected by impurities need not be carbonatic formations, but they may also, for example, be silicatic formations through which mineral-saturated formation waters flow.

Carbonatic and/or carbonate-containing impurities may form in the course of production, especially of geothermal heat or else of mineral oil, actually outside a reservoir formation, namely wherever a pressure and/or temperature change causes oversaturation of an aqueous solution. Mention should be made here especially of the production strings of production wells, above-ground equipment at the site of production, for example water/oil separation equipment, pipelines, heat exchangers or the like.

The invention further provides a process for increasing the permeability of underground carbonatic mineral oil-, natural gas- and/or hot water-bearing rock formations and for dissolving carbonatic and/or carbonate-containing impurities in the production of mineral oil and/or natural gas or geothermal power generation, in which an acidic formulation is injected into the rock formation through at least one well, wherein the acidic formulation comprises the inventive microcapsules.

Particularly advantageously in the process according to the invention, in a first step, an acid or aqueous solution or formulation thereof is injected into the rock formation through at least one well, and then the inventive acidic formulation comprising the inventive microcapsules is injected continuously in a second step through the same well(s).

The two steps of the process according to the invention are effected in immediate succession.

For the acid used in the first step of the process according to the invention, it is generally possible to use all acids suitable for the aforementioned end use, or aqueous solutions thereof. Advantageously, in the first step of the process according to the invention, the same acid is used as also serves as the base medium in the second step. Preferably, in the process according to the invention, an acidic solution or formulation based on alkanesulfonic acid(s) or an aqueous formulation comprising alkanesulfonic acid(s) is used as the base medium.

The well is made in a manner known in principle. It may be a production well or else an injection well. The production well is a well through which mineral oil or natural gas or hot water is withdrawn. In oil and gas exploration, former production wells, in some cases also dedicated injection wells, serve for injection of flooding media, inter alia, to maintain the pressure in the deposit. In geothermal power generation, generally considerable amounts of water are produced, which comprise not insignificant proportions of dissolved substances. In order to ensure the sustainability of this method of power generation, the recycling of the medium withdrawn into its original formation via injection wells of corresponding dimensions should be ensured. However, the power consumption at high injection pump outputs reduces the energetic efficiency of the entire plant over the course of years. An inventive acid treatment of the injection well reduces, by opening the underground migration paths, the energy to be expended in the injection of the cooled formation water, and thus advantageously contributes to a higher efficiency and hence higher productivity.

The inventive acid treatment widens fissures and pores in the carbonatic formation and/or dissolves carbonatic and/or carbonate-containing impurities.

If only impurities in a production and/or injection well are to be dissolved, it is sufficient to treat the well with the inventive acidic formulation.

The action time is determined by the person skilled in the art according to the local circumstances at the particular drilling site. It depends, for example, on the type of formation and of deposits and/or impurities to be removed, and the concentration of the acid. The action time may be a few minutes up to a few days.

The process according to the invention in the abovementioned embodiments can also be combined advantageously with hydraulic fracturing of the formation (hydraulic fracking). In this case, it is first possible to undertake fracturing of the formation with any flooding medium. The hydraulic fracturing can, however, also be undertaken with the inventive acidic formulation itself. Whether a simple acid treatment without hydraulic fracturing of the formation or a combined fracturing/acid treatment (acidizing fracking) is effected can be determined by the person skilled in the art in a manner known in principle by selection of the pressure with which the acidic formulation is injected into the formation.

In the preferred variant of the process according to the invention in 2 steps, the inventive acidic formulation is added only after the acid or acid formulation according to step 1 has opened up the rock formation in the region close to the borehole by acidizing, and has widened fissure paths and opened new additional fissure paths in the further-removed reservoir region. In general, such a stimulation, as a result of the not inconsiderable amount of pumped (cold) acid or acid formulation according to step 1, significantly cools the borehole equipment (tubings and parts of the pipework) and the rocks in the immediate environment of the borehole in the reservoir formation. The formation of the concentric temperature gradient already mentioned in the region close to the borehole, which takes place as a result, enables the use of the inventive microcapsules since the associated thermal trigger can be utilized correspondingly in this environment. An inventive mixture of the microcapsules with different trigger temperatures enables the already mentioned cascade-like release of the capsule contents. During the progressive pumping of the base medium (step 1), the inventive microcapsules can be metered continuously into the main stream (step 2), for example in a side stream by means of a membrane pump. The person skilled in the art selects the amount of the base medium with which the inventive microcapsules are pumped such that they can be introduced as far as possible into the reservoir zone.

The process according to the invention, particularly in the preferred variant thereof in 2 steps, ensures that the inventive microcapsules do not open until the inventive acidic formulation reaches zones with the appropriate trigger temperature (s), and the alkylsulfonic acid(s) present therein are thus released underground continuously into the mixture of formation water of the rock formation and the base medium diluted in this way. The acid is thus not already released in the pipeline or the carbonate formation close to the borehole. Thus, the inventive alkanesulfonic microcapsules, by virtue of the inventive use thereof, enable a controlled, continuous and retarded mordant effect on the fissure and pore spaces of underground carbonatic mineral oil- and/or natural gas-bearing or hot water-bearing rock formations in deep wells for mineral oil, natural gas or hot water production, and additionally offer the advantage of barely being corrosive with regard to the metallic borehole equipment.

The invention claimed is:

1. A microcapsule, comprising a core and a shell, wherein:
the core comprises an alkanesulfonic acid of formula (I):

$R^1$ represents a straight-chain, branched or cyclic $C_1$- to $C_6$-alkyl radical;
the shell comprises a synthetic or natural wax; and
the density of the microcapsule is greater than 1.0 g/cm³.

2. A method for acidizing, the method comprising contacting a material with the microcapsule of claim 1, wherein the method is suitable for acidizing a material within a carbonatic rock formation.

3. An acidic formulation, comprising the microcapsule of claim 1.

4. The acidic formulation of claim 3, comprising a mixture of the microcapsule with one or more waxes, such that when the mixture comprises two or more waxes said waxes have different melting points.

5. The acidic formulation of claim 4, wherein the one or more waxes have melting points in the range from 30 to 160° C.

6. The acidic formulation of claim 4, wherein the one or more waxes have melting points in the range from 30 to 160° C., and the mixture has several trigger ranges.

7. A method comprising treating a material with the acidic formulation of claim 3, wherein:
the material is a rock formation, a carbonate-containing impurity within a rock formation, or both; and
the method is suitable for increasing the permeability of an underground carbonatic mineral oil-bearing rock formation, a natural gas-bearing rock formation, a hydrothermal rock formation, or mixtures thereof, and for dissolving a carbonatic impurity, a carbonate-containing impurity, or both, in the production of mineral oil, natural gas, geothermal power, or mixtures thereof.

8. The method of claim 7, wherein the acidic formulation comprises a mixture of the microcapsule with one or more waxes, such that when the mixture comprises two or more waxes said waxes have different melting points.

9. The method of claim 8, wherein the one or more waxes have melting points in the range of from 30 to 160° C.

10. The method of claim 8, wherein the one or more waxes have melting points in the range of 30 to 160° C., and the mixture has several trigger ranges.

11. A process comprising injecting the acidic formulation of claim 3 into a rock formation through at least one well, wherein the process is suitable for increasing the permeability of an underground carbonatic mineral oil-bearing rock formation, a natural gas-bearing rock formation, a hydrothermal rock formation, or mixtures thereof, and for dissolving a carbonatic impurity, a carbonate-containing impurity, or both, in the production of mineral oil, natural gas, geothermal power, or mixtures thereof.

12. The process of claim 11, further comprising injecting an acid, an aqueous solution, or a formulation thereof, into the rock formation through the at least one well before the acidic formulation is injected.

13. The process of claim 11, further comprising hydraulic fracturing of the rock formation.

14. The microcapsule of claim 1, wherein $R^1$ represents a straight-chain, branched or cyclic $C_1$- to $C_4$-alkyl radical.

15. The microcapsule of claim 1, wherein said synthetic or natural wax has a melting point of from 30 to 135° C.

16. The microcapsule of claim 1, wherein said synthetic wax comprises at least one member selected from the group consisting of a polyethylene wax, a polypropylene wax, a Fischer-Tropsch wax that is optionally chemically modified, an amide wax, a montan wax, a paraffin wax, and a microcrystalline wax; and
said natural wax comprises at least one member selected from the group consisting of beeswax and carnauba wax.

17. The microcapsule of claim 1, wherein said synthetic wax comprises at least one member selected from the group consisting of a polyethylene wax, a polypropylene wax, a Fischer-Tropsch wax that is optionally chemically modified, an amide wax, a montan wax, a paraffin wax, and a microcrystalline wax.

18. The microcapsule of claim 1, wherein said natural wax comprises at least one member selected from the group consisting of beeswax and carnauba wax.

19. The microcapsule of claim 1, wherein the density of the microcapsule is greater than 1.2 g/cm³.

* * * * *